(12) United States Patent  (10) Patent No.: US 9,300,243 B2
Kinard  (45) Date of Patent: Mar. 29, 2016

(54) SELF-STABILIZING BARRICADE

(71) Applicant: Lovic Mark Kinard, Wimauma, FL (US)

(72) Inventor: Lovic Mark Kinard, Wimauma, FL (US)

( * ) Notice: Subject to any disclaimer, the term of this patent is extended or adjusted under 35 U.S.C. 154(b) by 178 days.

(21) Appl. No.: 14/094,632

(22) Filed: Dec. 2, 2013

(65) Prior Publication Data

US 2015/0152612 A1  Jun. 4, 2015

(51) Int. Cl.
*E01F 13/02* (2006.01)
*H02S 20/21* (2014.01)
*F21W 111/00* (2006.01)

(52) U.S. Cl.
CPC .............. *H02S 20/21* (2014.12); *E01F 13/02* (2013.01); *F21W 2111/00* (2013.01)

(58) Field of Classification Search
CPC ......... E01F 13/022; E01F 13/02; E01F 9/016; E01F 9/0165; E01F 9/017; E01F 9/0175; E04H 17/165
See application file for complete search history.

(56) References Cited

U.S. PATENT DOCUMENTS

| | | | | | |
|---|---|---|---|---|---|
| 3,490,749 | A | * | 1/1970 | Anderson | 256/64 |
| 4,710,053 | A | * | 12/1987 | Kulp et al. | 404/9 |
| 4,852,511 | A | * | 8/1989 | Look | E01F 13/02 116/63 P |
| 5,319,365 | A | * | 6/1994 | Hillinger | 340/908.1 |
| 5,594,433 | A | * | 1/1997 | Terlep | 340/908.1 |
| 7,494,111 | B2 | * | 2/2009 | Short | 256/26 |
| 2005/0063778 | A1 | * | 3/2005 | Connors | 404/9 |
| 2007/0252416 | A1 | * | 11/2007 | Park | A47C 4/48 297/16.2 |

* cited by examiner

*Primary Examiner* — Daniel P Stodola
*Assistant Examiner* — Jonathan Masinick
(74) *Attorney, Agent, or Firm* — Tiffany C. Miller; Inventions International Inc.

(57) ABSTRACT

A self-stabilizing barricade that is adapted to have an internal cable acting as a flexible hinge point mounted to the inside of the barricade supporting stand. The self-stabilizing barricade having a lighting system configured for a lens and a light emitting unit to be mounted to the upper position of the barricade supporting stand and a battery and battery case mounted to the lower position of the barricade supporting stand.

16 Claims, 10 Drawing Sheets

SELF-STABILIZING BARRICADE

BACKGROUND OF THE INVENTION

1. Field of the Invention

The present invention relates, generally, to a traffic barricade. More particularly, it relates to a barricade configured to be self-stabilized with a light emitting unit having a battery system with a low center of gravity and to be foldable with a cable acting as a flexible hinge point.

2. Background Art

The barricade light used with many conventional traffic barricades requires the use of a heavy battery case that is connected to a lens containing a bulb. When the barricade light and battery assembly are used on barricade signs, they are typically bolted to the hinge in the upper position of a barricade. The weight of the battery has a high center of gravity in this position and results in the barricade being top heavy and easily able to fall over by wind or minor collisions. When the barricade light and battery assembly are used on a barricade, the use of sand bags, although time consuming, are recommended to provide an anchoring force to overcome the high center of gravity of the heavy battery. The additional weight of the heavy sand bags contributes to the increased costs associated with the use of these sand bags in a barricade system. More particularly, costs can be incurred during the transportation of the sand bags to the site area, the fuel used during the transportation process, and the physical labor involved in the set-up and removal of the sand bags. Moreover, when the sand bags are discarded they contribute to environmental waste.

The barricade light and battery assembly create instability of the barricade structure when they are placed on the upper hinge portion of a barricade. Although sand bags are utilized as a ballast for the barricade, without a way of redistributing the weight of the barricade light and battery assembly away from the upper position of the barricade, heavy wind can cause the barricade to fall over on its side in a non-useful position.

Prior art barricades are not reliable when used in a setting where there are environmental elements including, but not limited to, wind. Thus, there is a need for a more efficient barricade that has the ability to withstand the forces of the elements without the use of a sand bag as a ballast.

There are several challenges to overcome with using a prior art barricade light and battery assembly on a barricade. One challenge being the need for the barricade to maintain stability without the need of sand bags as a ballast after the barricade light and battery assembly has been installed. The problem with the installation of a prior art barricade light and battery assembly onto a barricade is determining how to minimize instability of the barricade from the weight of the assembly. Thus, there is a need for an improved barricade that can accommodate a lighting system without compromising the stability of the barricade.

Prior art barricades incorporate a hinge with a fixed pivot point to the barricade legs, allowing the sign to be folded for storage. The problem with this design is the legs have to be on level ground or the barricade can be tipped one way or the other. The fixed pivot point increases the rigidity of the barricade, allowing the barricade to wobble when placed on an uneven surface. This instability is caused by the legs not being able to contour to an uneven surface, resulting in a high failure rate for the barricades to maintain an upright orientation. More particularly, a barricade that can conform to an uneven surface is more reliable, more functional, and can be placed in more locations than the rigid prior art barricades. Thus, there is a need for an improved barricade allowing for self-adjusting legs to contour to an uneven surface.

However, in view of the prior art considered as a whole at the time the present invention was made; it was not obvious to those of ordinary skill in the pertinent art how the identified needs could be fulfilled.

SUMMARY OF THE INVENTION

The long-standing but heretofore unfulfilled need for a barricade that is adapted to have an internal cable acting as a flexible hinge point mounted to the inside of the barricade supporting stand having a lighting system configured for a lens and a light emitting unit mounted to the upper position of the barricade supporting stand and a battery and battery case mounted to the lower position of the barricade supporting stand which also includes improvements that overcome the limitations of prior art barricades, is now met by a new, useful, and non-obvious invention.

The novel barricade includes a lighting system that is located on the barricade supporting stand. The lighting system has a lens and a light emitting unit including, but not limited to, an LED or a bulb that is adapted to fit on the upper position of the barricade supporting stand. Any light emitting unit is within the scope of this invention. A battery case having at least one electric storage medium including, but not limited to, a 6 volt battery, a conventional battery, a rechargeable battery, a lithium-ion battery, a lead-acid battery, a nickel-cadmium battery, or a dry cell battery is adapted to be connected to the lower position of the barricade supporting stand. The barricade supporting stand has a central opening adapted to receive the electrical wires that connect the light emitting unit to the battery. It is within the scope of this invention for the lighting system to be mounted to any barricade, including but not limited to, a cone, a barrel, a type 1 barricade, a type 2 barricade, a type 3 barricade, or a barrier wall.

The barricade support stand has an internal cable acting as a flexible hinge point. In a preferred embodiment, a cable has a primary end connected to an inner wall of a primary support stand and a secondary end connected to an inner wall of a secondary support stand. The cable connects the primary support stand to the secondary support stand, allowing the barricade to be foldable at a non-fixed hinge point. This results in the primary support stand and the secondary support stand to have a flexibility great enough to conform to an uneven surface. Although the preferred embodiment is a cable, it is within the scope of this invention for any flexible material to act as a hinge point including, but not limited to, rope, cord, cable, or leather. Traditional hinges rotate around a fixed axis. A flexible material allows the hinge point to vary so that the barricade can contour an uneven surface. Although the preferred embodiment is an internal support system having the cable located internal of the barricade support stand, it is within the scope of this invention to mount the cable on an external surface of the barricade.

The novel invention also includes an improved energy source to power the light emitting unit. More particularly, the preferred embodiment has at least one solar panel mounted on a surface of the barricade support stand. At least one solar panel is in communication with at least one rechargeable battery to act as a power supply for the light emitting unit. This solar power energy source is more reliable than standard batteries and allows the light emitting unit to operate without the intervention of a user replacing standard batteries when they have been exhausted.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
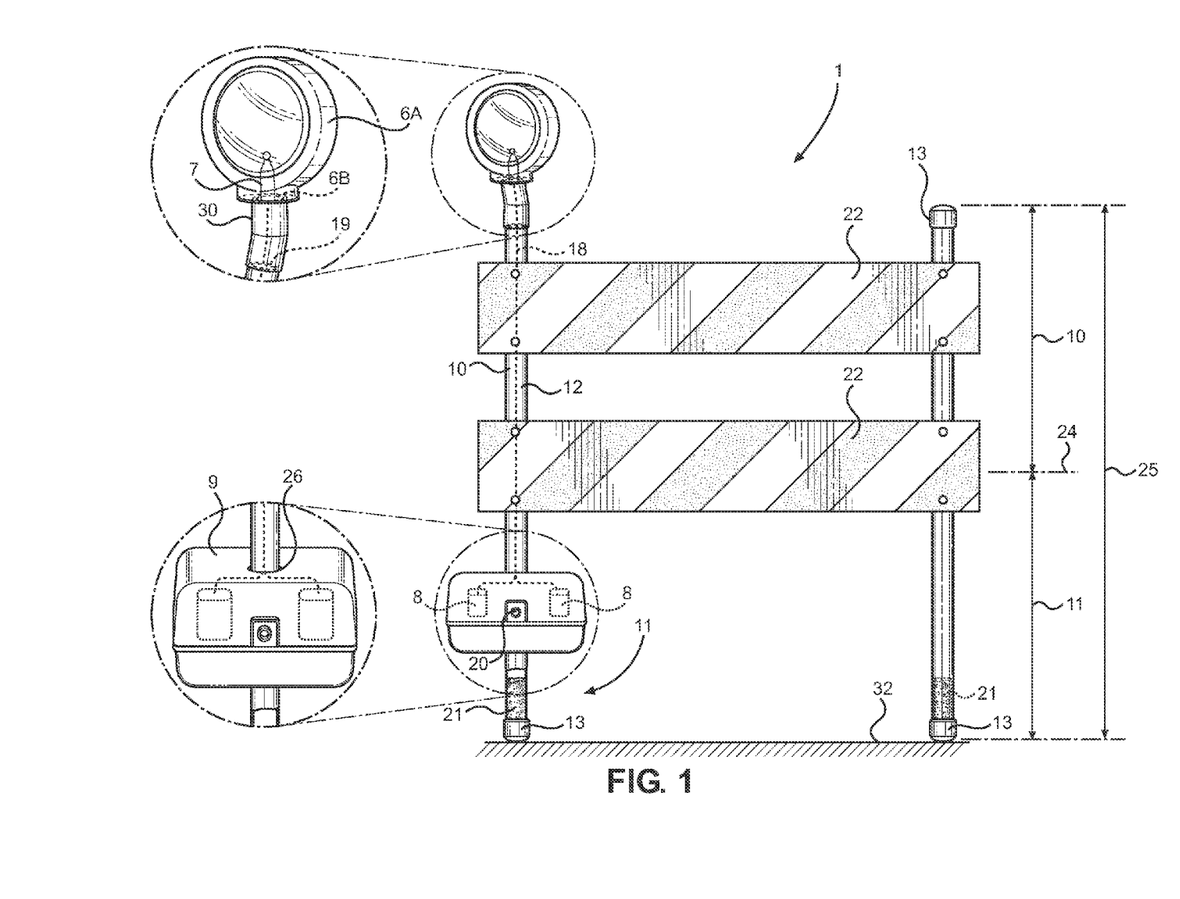
FIG. 1 is a front elevational view of the novel barricade lighting system.
Figure 2:
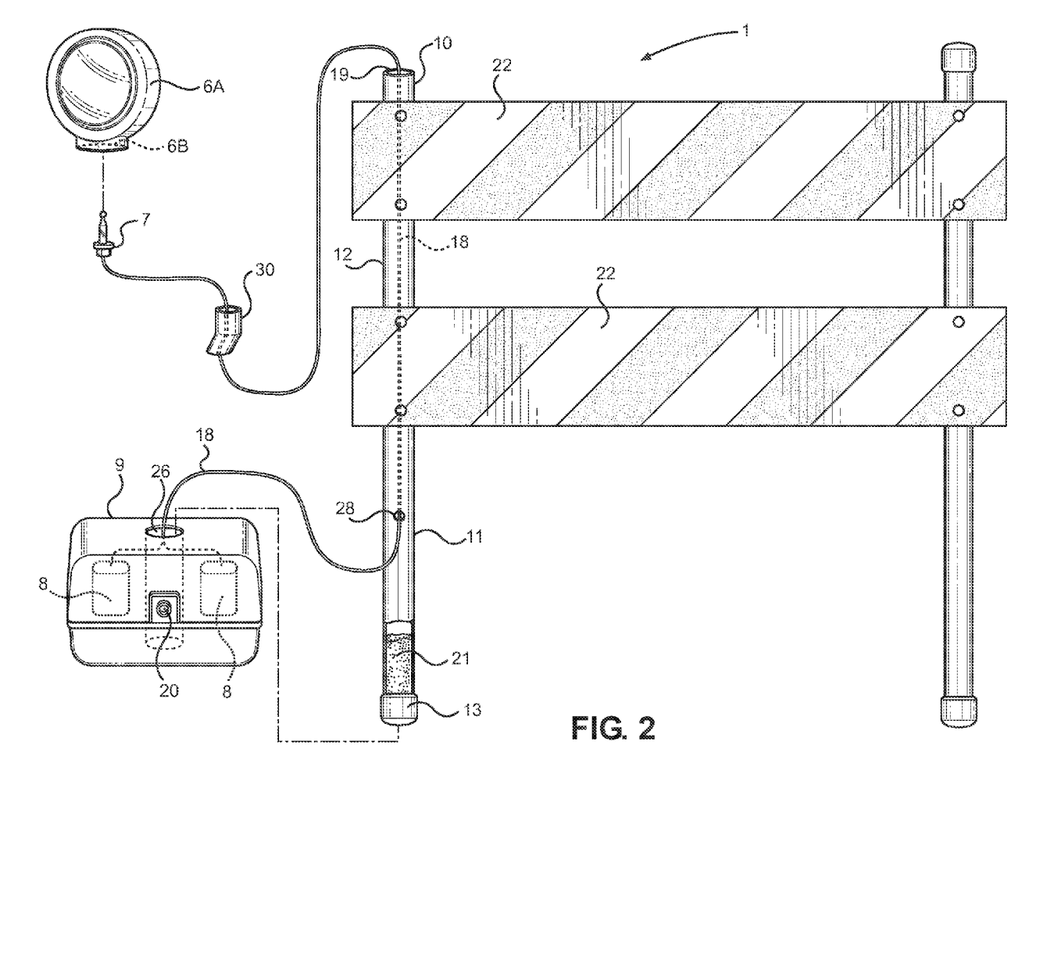
FIG. 2 is a front exploded view of the novel barricade lighting system.
Figure 7A:
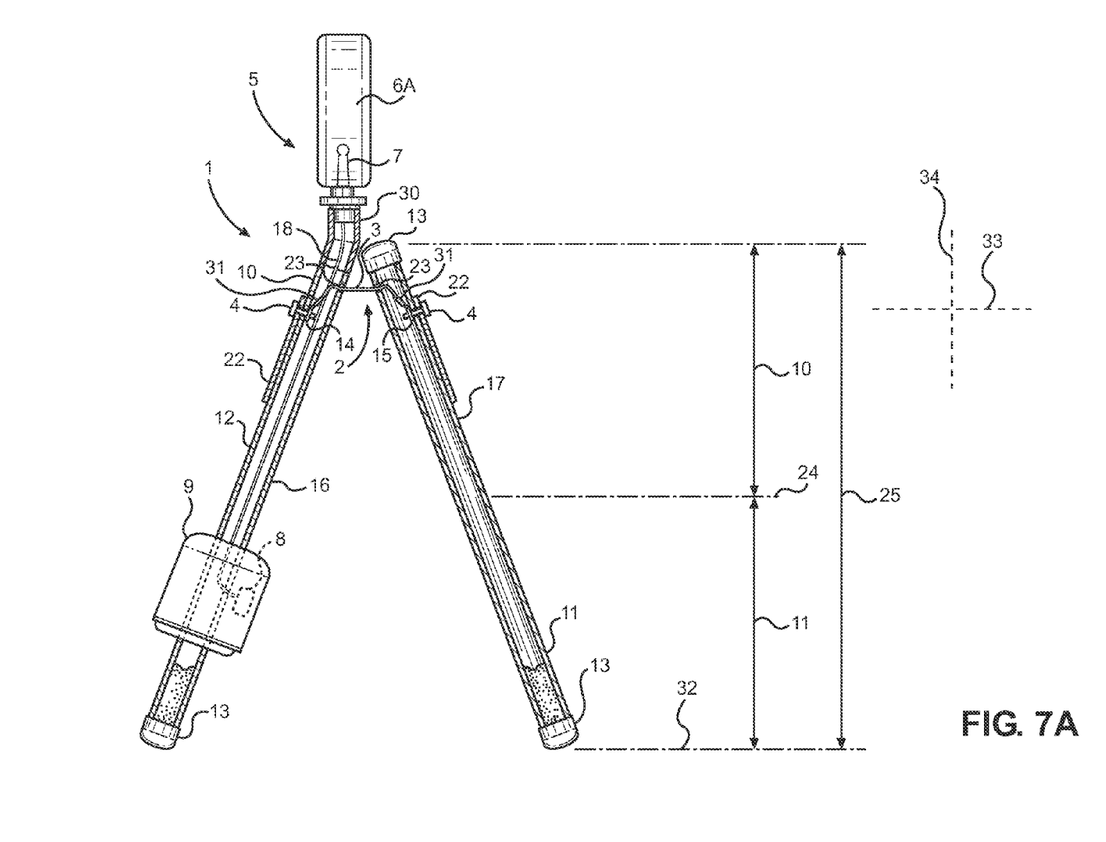
FIG. 7A is a side elevational view of the novel internal cable acting as a flexible hinge point and the novel barricade lighting system.

In a preferred embodiment, FIGS. 1 and 2 show barricade 1 having lighting system 5 with light emitting unit 7 and lens 6A. Lens 6A has opening 6B that receives a portion of light emitting unit 7. Connector 30 has a central opening (not shown) with an end that receives a portion of light emitting unit 7 and another end that is penetrated by upper position 10 of barricade support stand 12. FIGS. 1 and 7A best show barricade 1 having total height 25. Fifty percent of total height 25 is height 24. Upper position 10 is located in the upper fifty percent height position 10 of barricade support stand 12. Lower position 11 is located in the lower fifty percent height position 11 of barricade support stand 12. Connector 30 receives an end of barricade support stand 12 that is in the upper fifty percent height position 10 of barricade support stand 12.

FIGS. 1 and 2 further depict barricade supporting stand 12 having central opening 19 to receive electrical wire 18 which connects light emitting unit 7 including, but not limited to, a bulb or an LED to at least one battery 8. Battery 8 is located in battery case 9 at lower position 11 of barricade support stand 12. Battery case 9 is located on the lower position 11 of barricade 1 which is in the lower fifty percent position 11 of barricade 1. Opening 20 is located on a surface of battery case 9 to receive a fastener (not shown) including, but not limited to, a screw, a rivet, or a bolt to connect battery case 9 to barricade support stand 12. FIG. 2 best depicts opening 28 located on a surface of lower position 11 of barricade stand 12. Battery case 9 has a substantially central opening 26 that receives an end of barricade support stand 12, allowing opening 20 to align with opening 28. A fastener (not shown) penetrates both opening 20 and opening 28 to connect battery case 9 to lower position of barricade support stand 12.

Lighting system 5 can be adapted to operate within any of the barricade support stand legs 12 of barricade 1. Barricade support stand 12 is adapted to receive at least one panel 22 including, but not limited to, a reflector plate, a sign, or a solar panel. It is also within the scope of this invention for barricade support stand 12 having central opening 19 to receive including, but not limited to, a cable, an electrical wire, a battery, or sand. Barricade support stand 12 has a hollow structure with central opening 19 adapted to receive heavy substance 21 including, but not limited to, sand or water. Both ends of barricade support stand 12 have cap 13 to enclose central opening 19. When central opening 19 is covered with cap 13, heavy substance 21 is configured to act as a stored weight internal of lower position 11 of barricade support stand 12.

Figure 3:
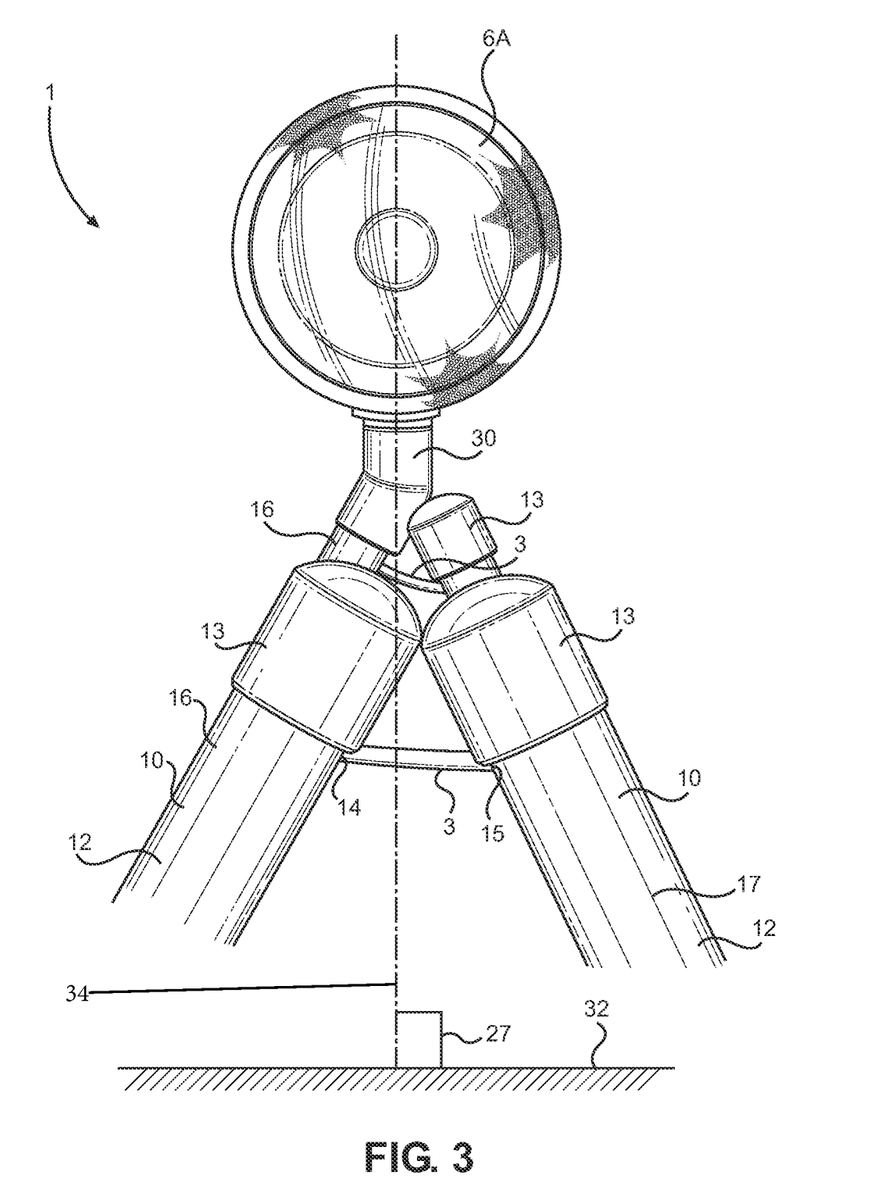
FIG. 3 is a perspective side view of the novel barricade lighting system and connector.
Figure 4:
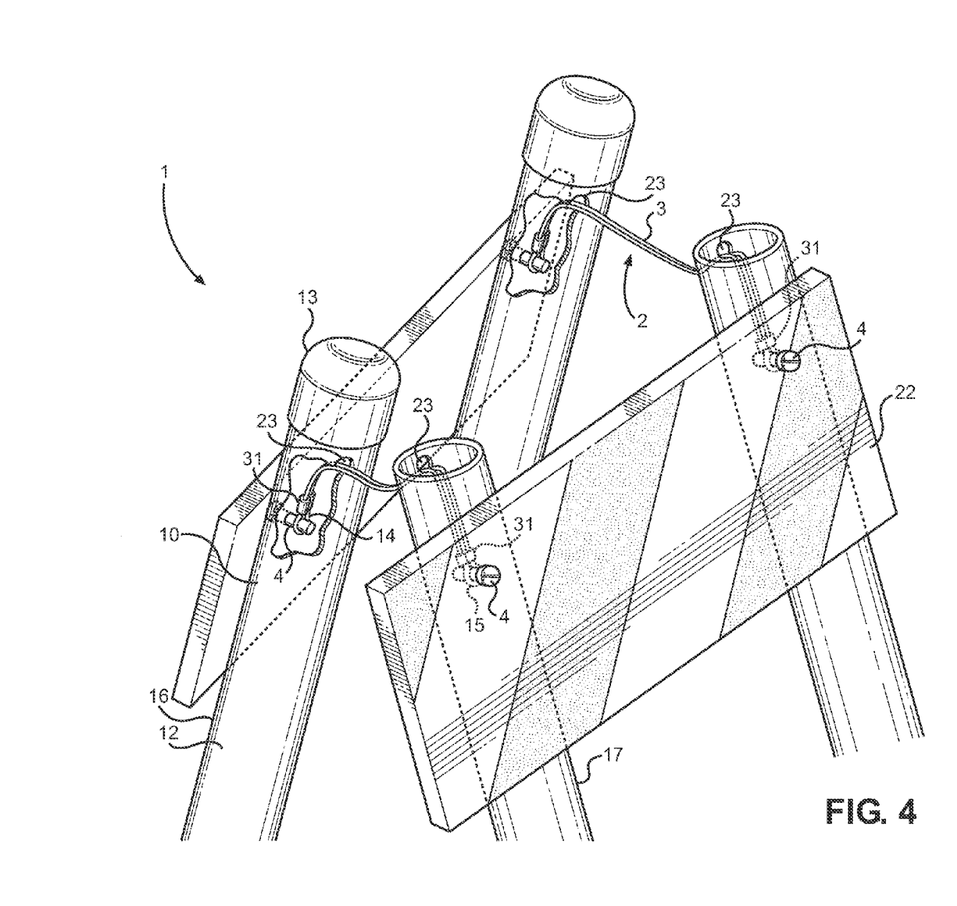
FIG. 4 is a top elevational view of the novel internal cable acting as a flexible hinge point.
Figure 5:
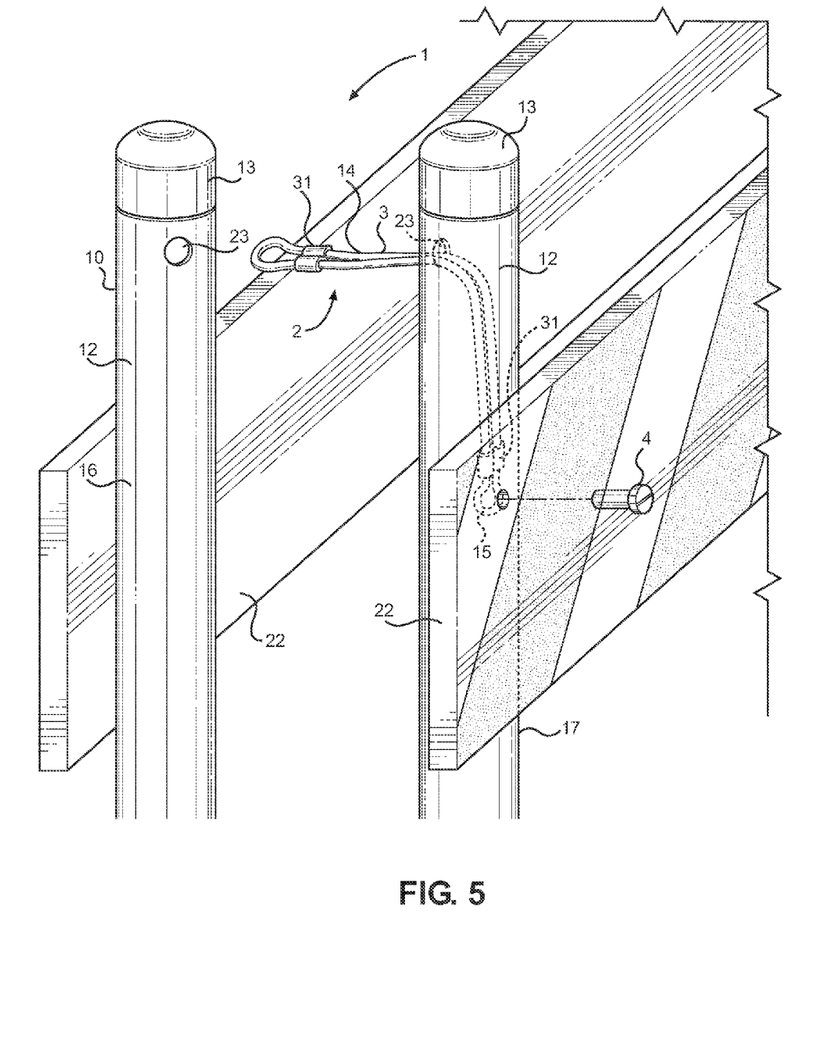
FIG. 5 is a side elevational view of the novel internal cable with thimble and clamp set.

FIG. 3 illustrates barricade 1 having lens 6A attached to an end of angled connector 30. The opposite end of angled connector 30 receives primary support stand 16. The angle of connector 30 has an angle great enough to position lens 6A in a substantially vertical position 34 in relation to ground 32. In a preferred embodiment, vertical position 34 of lens 6A is substantially ninety degrees 27 in relation to ground 32. Although not a preferred embodiment, it will be known that it is within the scope of this invention for lens 6A to be connected directly to upper position of barricade support stand 12. It is also within the scope of this invention for any light emitting unit to be connected to upper position 10 of barricade support stand 12. Cable 3 has primary end 14 located opposite secondary end 15. Primary end 14 attaches to inner surface (not shown) of primary support stand 16. Secondary end 15 attaches to inner surface (not shown) of secondary support stand 17. Cap 13 is located on the ends of barricade support stand 12.

FIG. 2 best illustrates barricade 1 having lighting system 5. Lens 6A has opening 6B to receive light emitting unit 7. In a preferred embodiment connector 30 (FIGS. 1, 2, 3, and 7A) has an end that receives an end of light emitting unit 7 and another end that receives upper position 10 of barricade support stand 12. Barricade support stand 12 has central opening 19. It is also within the scope of this invention for lens opening 6B to receive top portion 10 of barricade support stand 12 (not shown). FIGS. 2 and 7A show wire 18 having an end that is connected to light emitting unit 7 and another end that is connected to at least one battery 8 located in battery case 9. Wire 18 can have a protective coating (not shown) including, but not limited to, plastic or vinyl. Wire 18 enters top portion 10 of barricade support stand 12 central opening 19, travels through opening 28 located on a surface of bottom portion 11 of barricade support stand 12. Battery case 9 has substantially central opening 26 that receives bottom portion 11 of barricade support stand 12. Opening 28 of barricade support stand 12 and opening 20 of battery case 9 align so that a fastener (not shown) can enter opening 20 and opening 28 and connect battery case 9 to lower position 11 of barricade support stand 12.

FIGS. 4-7A depict barricade 1 having internal cable 3 acting as a flexible hinge point 2. Upper position 10 of barricade support stand 12 has opening 23 located on a surface thereon to receive cable 3. Cable 3 has primary cable end 14 attached to an inner surface of primary supporting stand 16 and secondary cable end 15 attached to an inner surface of secondary supporting stand 17. It is within the scope of this invention for cable 3 to be attached to inner surface of barricade support stand 12 by a fastener including, but not limited to, thimble and clamp set 31. Cable 3 is connected to inner surface of barricade support stand 12 with fastener 4 including, but not limited to, a screw, a rivet, or a bolt.

The preferred embodiment is for fastener 4 to be received by an opening (not shown) in panel 22, to penetrate top portion 10 of barricade support stand 12, and to attach cable 3 ends to inner surface of supporting stand 12. Thimble and clamp set 31 is used to create a loop configuration at cable 3 primary end 14 and at secondary end 15. Fastener 4 penetrates an opening (not shown) in panel 22, through an opening (not shown) in barricade support stand 12, and anchors cable 3 at the loop portion. It is also within the scope of this invention for cable 3 to be attached to bottom portion 11 (FIG. 2) of inner surface of barricade support stand 12. Barricade support stand 12 has caps 13 located on either end.

Figure 7B:
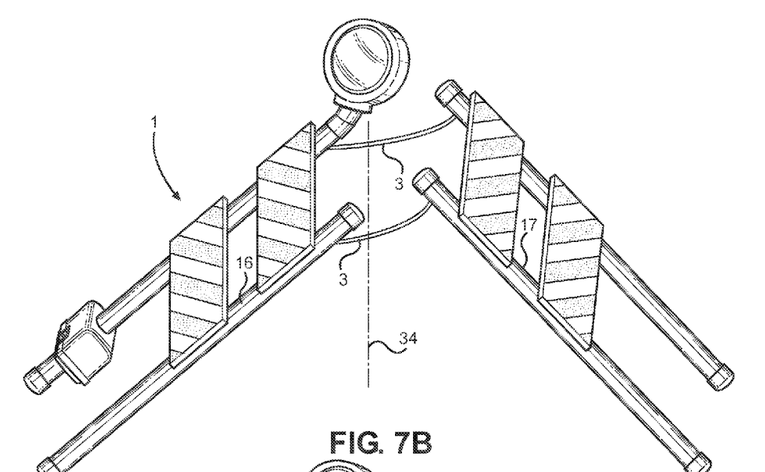
FIG. 7B is a side perspective view of the barricade configured for the primary support stand to orient in a lower position along a substantially vertical orientation in relation to the secondary support stand.
Figure 7C:
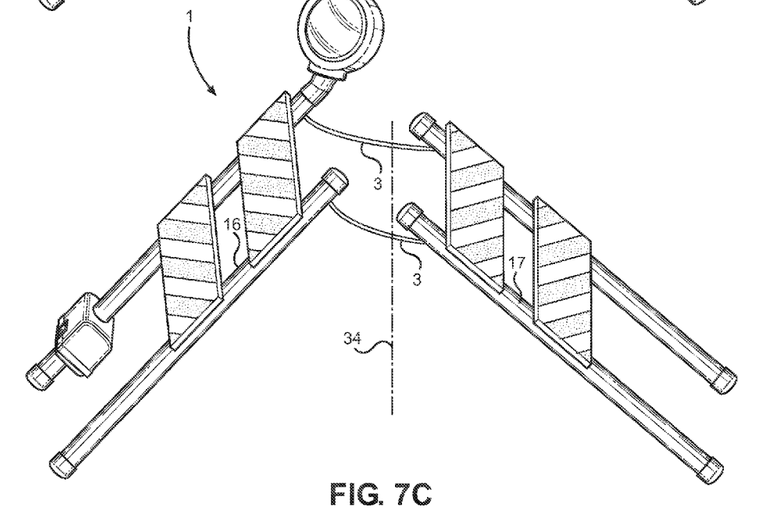
FIG. 7C is a side perspective view of the barricade configured for the primary support stand to orient in an upper position along a substantially vertical orientation in relation to the secondary support stand.

FIG. 7B depicts barricade 1 having primary support stand 16 oriented in a lower position along a substantially vertical orientation 34 in relation to secondary support stand 17. Cable 3 has an end that is connected to primary support stand 16 and an opposite end connected to secondary support stand 17. FIG. 7C depicts barricade 1 having primary support stand 16 oriented in an upper position along a substantially vertical orientation 34 in relation to secondary support stand 17. Cable 3 has an end that is connected to primary support stand 16 and an opposite end connected to secondary support stand 17.

Figure 8A:
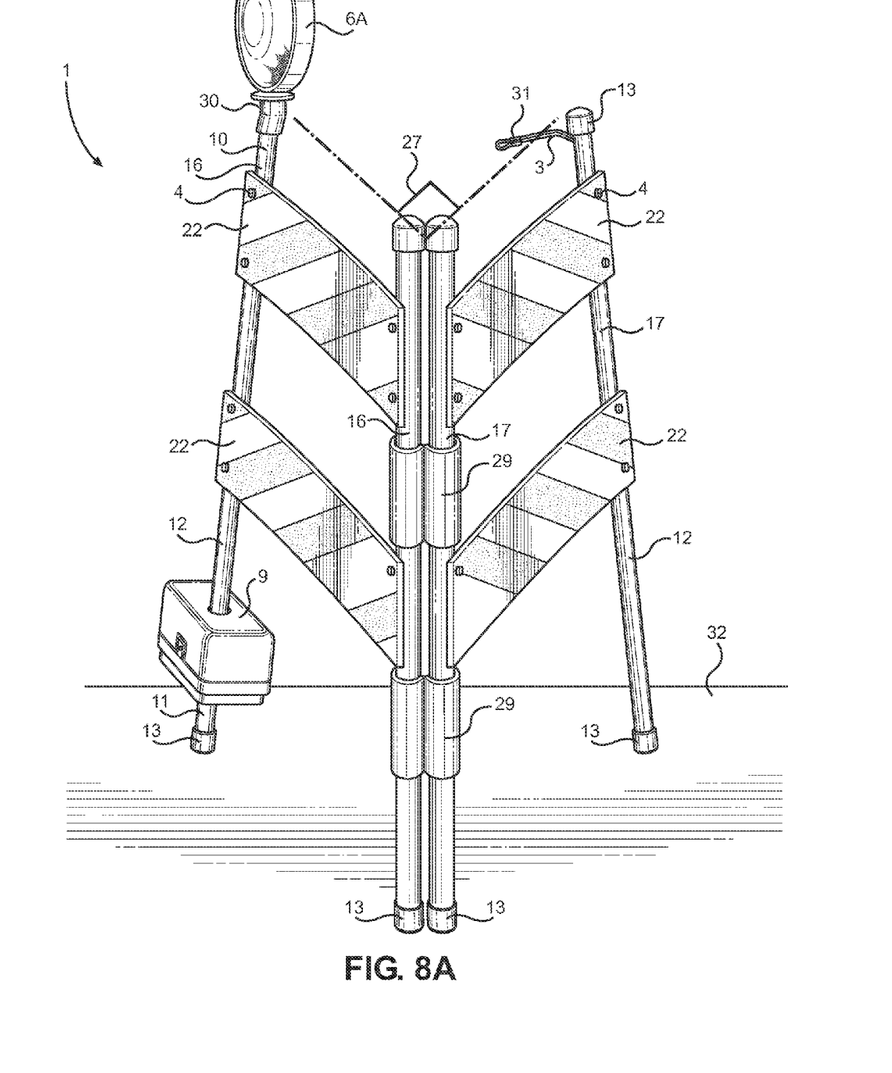
FIG. 8A is a side perspective view of the novel barricade configured at approximately a ninety degree angle with a leg clamp.

FIG. 8A shows barricade 1 having internal cable 3 with thimble and clamp set 31 at its end. Fastener 4 can be removed from panel 22 that penetrates primary support stand 16 to release cable 3 from attaching primary support stand 16 with secondary support stand 17 together. When cable 3 is disconnected from at least one of the barricade support stands 12, it allows the barricade to be in an open configuration and to connect with other barricade support stands 12 with a removable attaching element 29 (FIGS. 8A-8C) including, but not limited to, a clamp, a rope, a chain, hook and loop attachments, a strap, or tie straps.

Figure 8B:
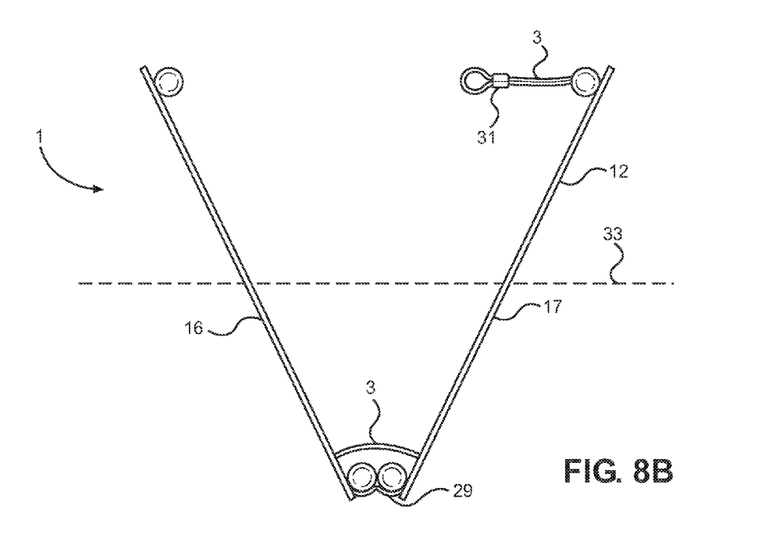
FIG. 8B is a top perspective view of the barricade configured for the primary support stand to orient in an open position along a substantially horizontal orientation in relation to the secondary support stand; and, FIG. 8C is a top perspective view of the barricade configured for the primary support stand to orient in a closed position along a substantially horizontal orientation in relation to the secondary support stand.
Figure 8C:
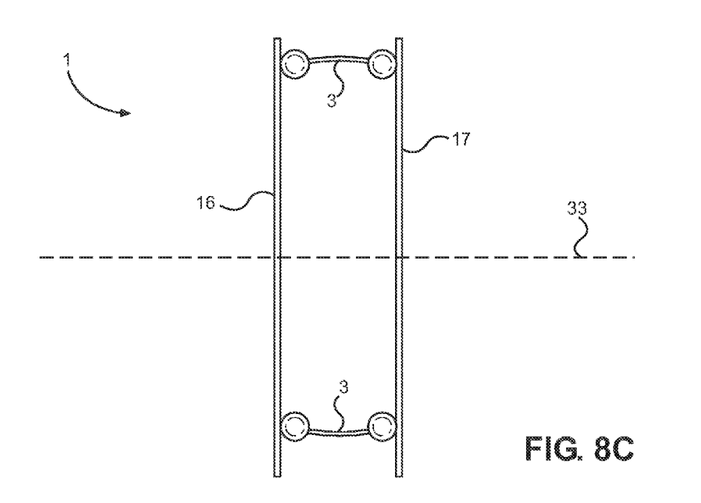

A preferred embodiment of the open configuration of barricade 1 is approximately ninety degrees 27 in relation to primary support stand 16 and secondary support stand 17. However, barricade 1 can be configured at any angle that will allow barricade support stand leg 12 to be attached to a plurality of barricades. Ends of barricade support stand have cap 13. Battery case 9 is located on the lower position 11 of barricade support stand 12. Lens 6A is located on upper position 10 of barricade support stand 12. Connector 31 receives an end of barricade support stand 12. FIGS. 7A, 8B and 8C show substantially horizontal axis 33 and substantially vertical axis 34.

FIG. 8B illustrates barricade 1 configured for primary support stand 16 be oriented in an open position along a substantially horizontal orientation 33 in relation to secondary support stand 17. The open position is a result of at least one cable 3 being detached from a primary support stand 16 or secondary support stand 17. Connector 30 connects primary support stand 16 to secondary support stand 17. It is a preferred embodiment for connector 30 to have an angle of 120 degrees. It is within the scope of this invention for connector 30 to have an angle between 100 degrees and 160 degrees. At least one connector 30 can be located on the upper position 10 of barricade support stand 12 or lower position 11 of barricade support stand 12 to help stabilize barricade 1 in an open configuration and to maintain the structure of the open configuration of barricade 1. Cable 3 has an end that is connected to primary support stand 16 and an opposite end connected to secondary support stand 17. Cable 3 end has a thimble and clamp set 31. FIG. 8C shows barricade 1 configured for primary support stand 16 to be oriented in a closed position along a substantially horizontal orientation 33 in relation to secondary support stand 17. Cable 3 has an end that is connected to primary support stand 16 and an opposite end connected to secondary support stand 17.

These embodiments are illustrative of the invention and are not exhaustive thereof. As barricade manufacturers develop different barricade structures, a lighting system having a battery with a low center of gravity may be required in future embodiments of the invention but all such future embodiments are within the scope of this invention.

For example, a barricade may be a barrel (not shown). Thus, the lighting system (not shown) would still have the lens (not shown) and light emitting unit (not shown) located on the top portion of the barrel, a wire (not shown) having an end connecting to the light emitting unit and another end connected to a battery (not shown) located on the bottom portion (not shown) of the barrel. The wire connecting the light emitting unit to the battery is located internal of the barrel.

In addition to the aforesaid embodiments of novel barricade 1, lighting system 5 and internal cable 3 acting as a flexible hinge point includes multiple additional improvements as well.

A first improvement as shown in FIGS. 1-3, 7, and 8A is angled connector 30 that attaches light emitting unit 7 to upper position 10 of barricade support stand 12. Angled connector 30 is configured to position light emitting unit 7 in an upright alignment in relation to ground 32 (FIG. 3).

A second improvement is for panel 22 to be a solar panel (not shown). When the solar panel is in direct contact with sunlight, energy is used for recharging batteries.

A third improvement is that each barricade support stand leg 12 can have wire 18 for use with lighting system 5 having battery system 8 with a lower center of gravity (not shown). Barricade supporting structure legs 12 have ends covered with cap 13 when not in use (FIGS. 1-8A).

A fourth improvement allows for a heavy material 21 (FIGS. 1 and 2) such as sand or water to be placed into the legs of the barricade support structure to weigh it down. When the sand is placed internal to barricade support stand 12, it eliminates the use of a sand bag being placed in the exterior of barricade 1.

An important object of this invention is the addition of an internal cable 3 acting as a flexible hinge point 2 (FIGS. 4-7A). Barricade 1 can be easily foldable and has the flexibility to conform to an uneven surface. FIGS. 8A and 8B show that cable 3 can be unfastened from one end of barricade support stand 12 allowing for barricade 1 to be in an open configuration. Attaching element 29 (FIGS. 8A and 8B) connects primary support stand leg 16 with secondary support stand leg 17 of barricade 1. A plurality of barricade support stand legs 12 (not shown) can be connected together to form a larger barricade structure around a site. For example, a primary support stand leg is attached by at least one first attaching element to a secondary support stand leg of a primary barricade. A secondary support stand leg of the primary barricade is attached by at least one second attaching element to a primary support stand leg of a secondary barrier.

Another important object is lighting system 5 configured for an internal wire 18 to connect light emitting unit 7 to upper position 10 of barricade support stand 12 and to have battery 8 connected to lower position 11 of barricade support stand 12. This configuration of lighting system 5 having a low center of gravity provides an anchoring force to allow barricade lto be less inclined to fall over from the elements.

These and other important objects, advantages, and features of the invention will become clear as this description proceeds.

The invention accordingly comprises the features of construction, combination of elements, and arrangement of parts that will be exemplified in the description set fourth hereinafter and the scope of the invention will be indicated in the claims.

Construction of the Novel Self-Stabilizing Barricade

Referring now to FIG. 8A, it will be seen that the reference numeral 1 denotes an illustrative embodiment of novel barricade 1 as a whole. Novel barricade 1 has primary structure 16 and secondary structure 17 each having an end in contact with ground 32. Primary structure 16 and secondary structure 17 are pivotally connected at an end located opposite the end contacting ground 32. Referring again to FIGS. 7B and 7C, the pivotal connection has flexible material 3 configured to allow primary structure 16 to orient in an upper position (FIG. 7C) or a lower position (FIG. 7B) along a substantially vertical orientation 34 in relation to secondary structure 17.

Referring again to FIGS. 1, 2, and 7A, barricade 1 has primary structure 16 and secondary structure 17 with power supply 8 connected to lower fifty percent portion 11 of primary structure 16 or secondary structure 17. Power supply 8 is in electrical communication 18 with light emitting unit 7. Primary structure 16 or secondary structure 17 have light emitting unit 7 connected to upper fifty percent portion 10 of primary structure 16 or secondary structure 17. Light emitting unit 7 has an end that is received by a primary end of angled connector 30. Secondary end of angled connector 30 receives an end of upper fifty percent portion 10 of primary structure 16 or secondary structure 17. Angled connector 30 has an angle between 100 degrees and 160 degrees.

Figure 6:
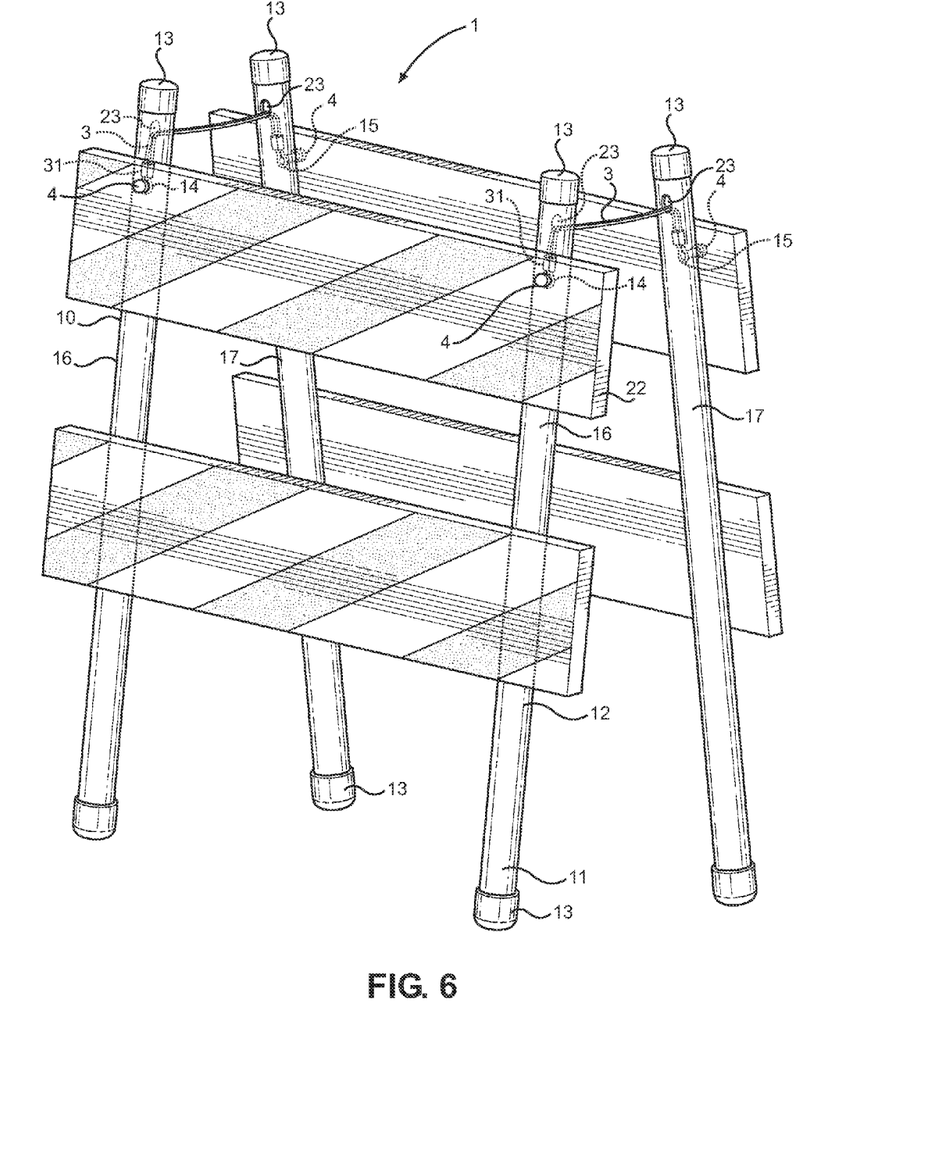
FIG. 6 is a front elevational view of the novel internal cable acting as a flexible hinge point.

Referring to FIG. 6, barricade 1 has primary structure 16 or secondary structure 17 having at least one reflector plate 22. An embodiment not shown is primary structure or secondary structure can have at least one solar panel (not shown) supported by a primary structure or a secondary structure. At least one solar panel is in electrical communication with a power supply.

Referring now to FIGS. 8A and 8B, Primary structure 16 and secondary structure 17 each have an end in contact with ground 32. Primary structure 16 and secondary structure 17 are pivotally connected at an end opposite the end contacting ground 32. The pivotal connection has flexible material 3 configured to allow primary structure 16 to orient in an open or a closed position along a substantially horizontal orientation 33 in relation to secondary structure 17. Attaching element 29 is located on a surface of primary structure 16 configured to connect primary structure 16 to secondary structure 17. At least one end of flexible material 3 from primary structure 16 disconnects from secondary structure 17 so that primary structure 16 and secondary structure 17 can pivotally hinge on an open position. At least one attaching element 29 connects primary structure 16 to secondary structure 17 of a plurality of barricades (not shown). A primary structure or a secondary structure of a primary barricade is connected by at least one attaching element to a primary structure or a secondary structure of a secondary barricade.

Referring again to FIG. 1, barricade 1 is hinged on an end opposite an end contacting ground 32. Barricade structure 12 has an end located in lower position 11. Lower position 11 is in contact with ground 32. Barricade structure 12 also has an end located in upper position 10. Light emitting unit 7 is connected to upper position 10 of barricade structure 12. Power supply 8 is electrically connected to light emitting unit 7. Power supply 8 is mounted on lower position 11 of barricade structure 12. Lower position 11 is located below barricade structure 12 centerline 24.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A barricade, comprising:
    a first structure and a second structure, said first structure and said second structure each having an end in contact with the ground, said first structure and said second structure being pivotally connected at an end located opposite said end contacting said ground, said first structure having a first structure opening, said second structure having a second structure opening;
    a panel connected to said first structure, whereby, said panel having a panel opening overlaying said first structure opening;
    a portion of a first fastener is received by both of said panel opening and said first structure opening of said first structure, whereby, an end of said first fastener is located inside of said first structure;
    a portion of a second fastener is received by said second structure opening of said second structure, whereby, an end of said second fastener is located inside of said second structure; and,
    said pivotal connection comprising:
    a flexible material having a first end located opposite a second end, said first end of said flexible material is connected to a first thimble and clamp set, said second end of said flexible material is connected to a second thimble and clamp set, said first end of said flexible material is connected to an inner surface of said first structure by said first fastener, said second end of said flexible material is connected to an inner surface of said second structure by said second fastener, said flexible material is configured to allow said first structure to orient in an upper position or a lower position along a substantially vertical orientation in relation to said second structure.

2. The barricade of claim 1, wherein said first structure or said second structure have a power supply connected to the lower 50% portion of said first structure or said second structure, said power supply having an electrical communication with a light emitting unit.

3. The barricade of claim 2, wherein said first structure or said second structure having said light emitting unit connected to the upper 50% portion of said first structure or said second structure.

4. The barricade of claim 3, wherein said light emitting unit has an end that is received by a first end of an angled connector, a second end of said angled connector receives an end of said upper 50% portion of said first structure or said second structure, said angled connector has an angle between 100 degrees and 160 degrees.

5. The barricade of claim 1, wherein said flexible material is configured to allow said first structure to pivot in an open position or a closed position along a substantially horizontal orientation in relation to said second structure, an attaching element located on a surface of said first structure is configured to connect said first structure to said second structure, at least one end of said flexible material from said first structure disconnects from said second structure so that said first structure and said second structure can pivotally hinge in said open position.

6. The barricade of claim 1, wherein said first structure has a central opening adapted to receive a substance, whereby, said substance is internally retained within said first structure.

7. The barricade of claim 6, wherein said substance is sand.

8. The barricade of claim 6, wherein said substance is water.

9. A barricade, comprising:
   a first structure and a second structure, said first structure and said second structure each having an end in contact with the ground, said first structure and said second structure being pivotally connected at an end opposite said end contacting said ground, said first structure having a first structure opening, said second structure having a second structure opening;
   a panel connected to said first structure, whereby, said panel having a panel opening overlaying said first structure opening;
   a portion of a first fastener is received by both of said panel opening and said first structure opening of said first structure, whereby, an end of said first fastener is located inside of said first structure;
   a portion of a second fastener is received by said second structure opening of said second structure, whereby, an end of said second fastener is located inside of said second structure;
   said first structure has a central opening adapted to receive a substance, whereby, said substance is internally retained within said first structure;
   said pivotal connection comprising:
   a flexible material having a first end located opposite a second end, said first end of said flexible material is connected to a first thimble and clamp set, said second end of said flexible material is connected to a second thimble and clamp set, said first end of said flexible material is connected to an inner surface of said first structure by said first fastener, said second end of said flexible material is connected to an inner surface of said second structure by said second fastener, said flexible material is configured to allow said first structure to orient in an open position or a closed position along a substantially horizontal orientation in relation to said second structure;
   an attaching element located on a surface of said first structure is configured to connect said first structure to said second structure; and,
   at least one end of said flexible material from said first structure disconnects from said second structure so that said first structure and said second structure can pivotally hinge in said open position.

10. The barricade of claim 9, wherein said first structure or said second structure have a power supply connected to the lower 50% portion of said first structure or said second structure, said power supply having an electrical communication with a light emitting unit.

11. The barricade of claim 10, wherein said first structure or said second structure having said light emitting unit connected to the upper 50% portion of said first structure or said second structure.

12. The barricade of claim 11, wherein said light emitting unit has an end that is received by a first end of an angled connector, a second end of said angled connector receives an end of said upper 50% portion of said first structure or said second structure, said angled connector has an angle between 100 degrees and 160 degrees.

13. The barricade of claim 9, wherein said attaching element connects said first structure and second structure of a plurality of barricades, whereby, said first structure or said second structure of a first barricade is connected by said attaching element to said first structure or said second structure of a second barricade.

14. The barricade of claim 9, wherein said flexible material is configured to allow said first structure to orient in an upper position or a lower position along a substantially vertical orientation in relation to said second structure.

15. The barricade of claim 9, wherein said substance is sand.

16. The barricade of claim 9, wherein said substance is water.

* * * * *